United States Patent [19]

Beismann et al.

[11] 4,247,894
[45] Jan. 27, 1981

[54] ARRANGEMENT FOR PROGRAM INTERRUPTION

[75] Inventors: Walter F. Beismann, Altdorf; Hans H. Lampe, Herrenberg; Werner H. Pohle, Grafenau, all of Fed. Rep. of Germany

[73] Assignee: International Business Machines Corporation, Armonk, N.Y.

[21] Appl. No.: 962,549

[22] Filed: Nov. 20, 1978

[30] Foreign Application Priority Data

Dec. 9, 1977 [DE] Fed. Rep. of Germany ....... 2754890

[51] Int. Cl.³ .............................................. G06F 9/46
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,226,694 | 12/1965 | Wise | 364/200 |
| 3,290,658 | 12/1966 | Callahan et al. | 364/200 |
| 3,828,325 | 8/1974 | Stafford et al. | 364/200 |
| 3,905,025 | 9/1975 | Davis et al. | 364/200 |
| 3,984,820 | 10/1976 | Stanley et al. | 364/200 |
| 4,047,161 | 9/1977 | Davis et al. | 364/200 |
| 4,086,626 | 4/1978 | Chung | 364/200 |
| 4,096,566 | 6/1978 | Borie et al. | 364/200 |
| 4,103,329 | 7/1978 | Davis et al. | 364/200 |
| 4,104,721 | 8/1978 | Markstein et al. | 364/200 |

OTHER PUBLICATIONS

IBM System 1370 Principles of Operation Form GA2-2-7000, pp. 22, 23, 29–37, 70–75, 89–93, 105, 110, 113, 114.

IBM 1410 Data Processing System CE Manual of Instruction, No. 255-6549, pp. 459–464.
Forgie, "The Lincoln TX-2 I/O System", pp. 156–160, 1957.
Dennison et al., "Internal Masking of Interrupts", IBM TDB vol. 20, No. 8 pp. 3277–3278.

*Primary Examiner*—Mark E. Nusbaum
*Attorney, Agent, or Firm*—Robert Lieber

[57] ABSTRACT

In a microprogram controlled processor a master mask signal, generated selectively under microprogram control, synchronizes the handling of asynchronously generated interruption requests to desired sequence stages in the interpretation of program instructions. A programmed interrupt request (PIRR) associated with the interruption priority level of the program currently in control of the processor is maintained effective for a limited period of time after the associated program assumes control. This period is determined by the presence of a PIRR (—bit) which is interruptable by any higher priority level interrupt request. If a PIRR bit representing an interrupted program is still on when servicing of a higher priority level interrupt request is concluding control is returned to the interrupted program. In order to avoid possibly locking out programs which are not associated with asynchronously generated interrupt requests—e.g., supervisor programs—a pre-settable interval timer is provided for operating after a predetermined time interval to force the setting of a PIRR bit and thereby force control to be transferred eventually to such programs.

15 Claims, 13 Drawing Figures

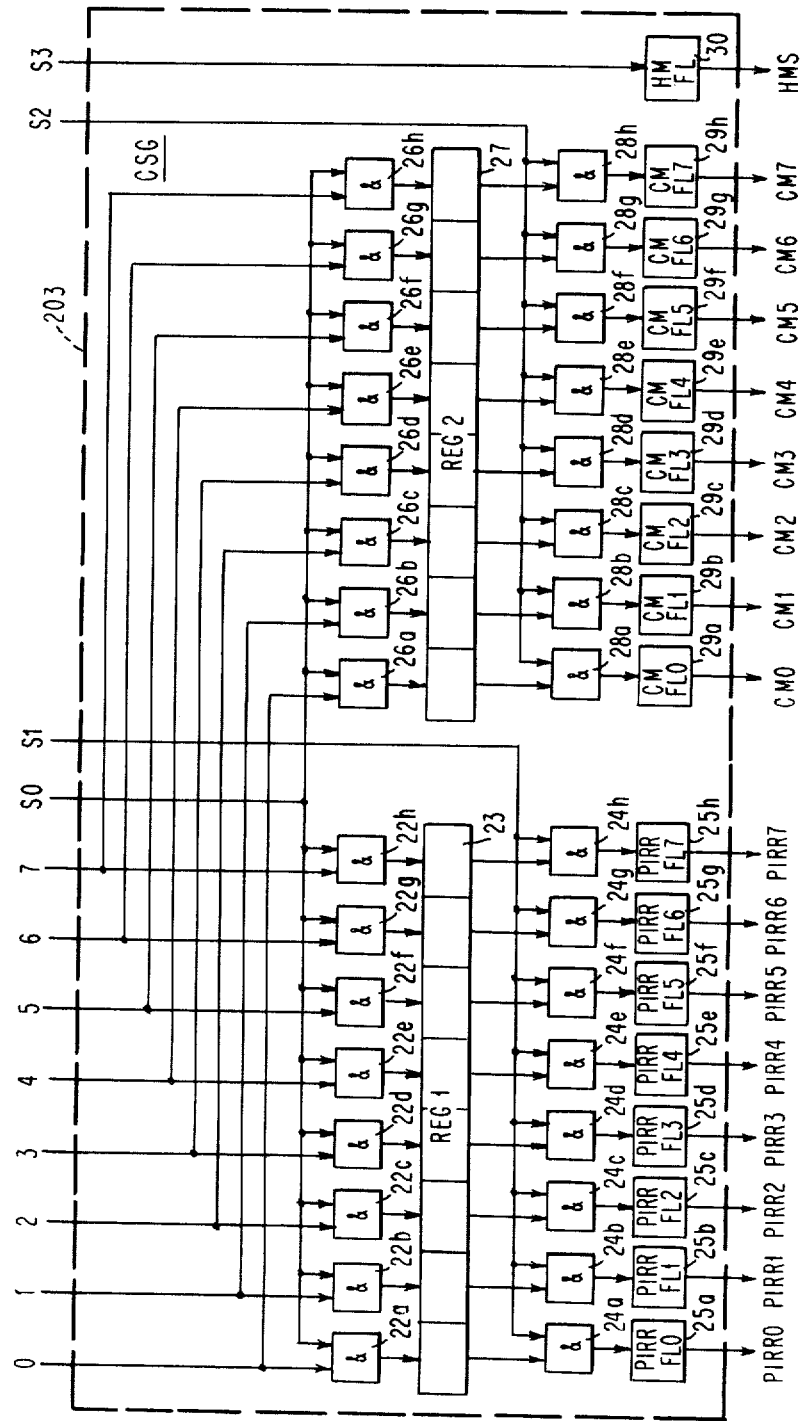

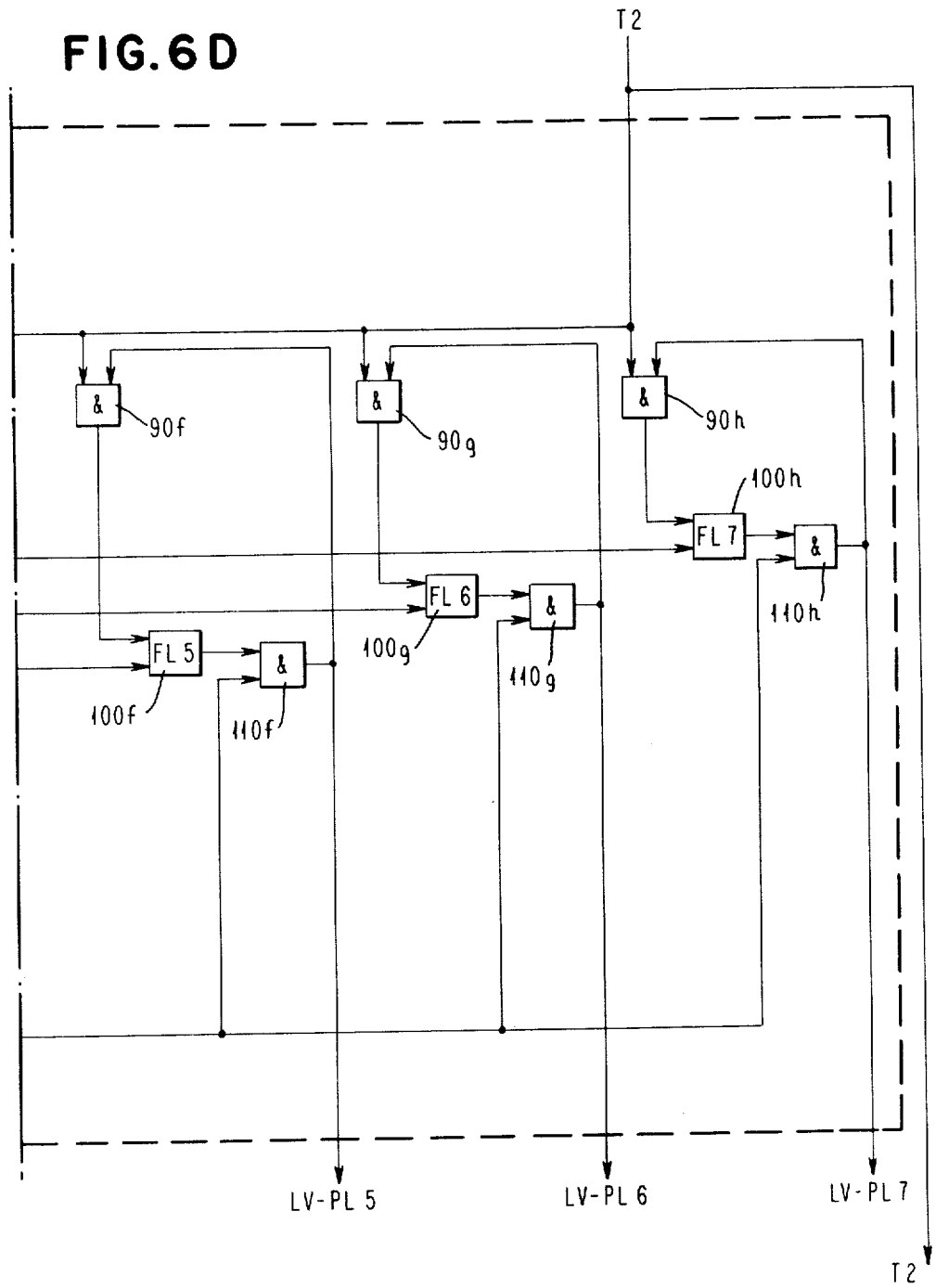

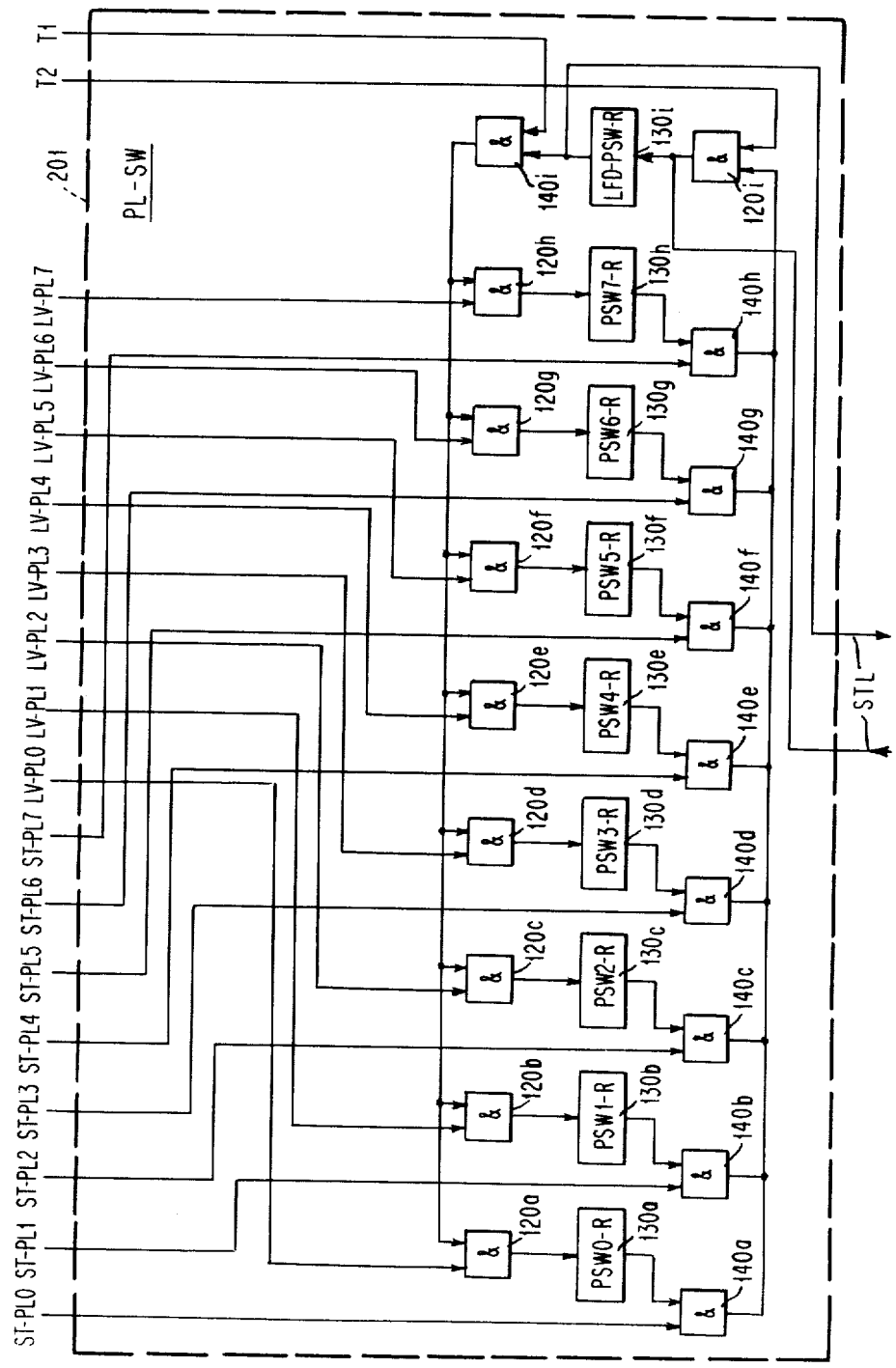

ARRANGEMENT FOR PROGRAM INTERRUPTION

BACKGROUND OF THE INVENTION

The invention concerns an arrangement for synchronizing the handling of asynchronously occurring requests for program interruption in a data processing system.

For the implementation of program interrupts and the control of priority-dependent program level switching, known data processing systems employ essentially two principles:

1. the periodic testing of asynchronous processes external to the processor for operator intervention, if necessary, and
2. the direct intervention of the asynchronous external processes in the processor sequence (subject to control by masks and priority conventions).

The first principle is used mainly in processors with only one program level (i.e., with only one instruction address register, only one condition code register, and only one local storage), so that, if necessary, i.e., in the case of an asynchronous, external request, a switch may be effected to the programs provided for external operation.

In contrast to this, processors operating in accordance with the second principle are subject to particular conditions inherent in their circuit structure:

priority circuits for determining in each case the highest request priority when several requests are simultaneously encountered, and separate instruction address registers, condition code registers, and local storages associated with the individual priority levels.

The following description is based on a processor operating in accordance with the second principle. This processor is assumed to have eight interrupt levels with the appertaining instruction address registers, condition code registers, and local storages. These eight interrupt levels are designated as 0 to 7, the highest priority being assigned to level 0 and the lowest to level 7.

For controlling the eight interrupt levels or, as will be described further on, program levels, the processor is provided with the necessary priority circuits as well as with different masks to overrule the control of the priority circuits within defined limits.

In known data processing systems of this kind the eight program levels are associated with respective microprograms provided for implementing the associated processes. FIG. 3 in the drawings described below shows which functions can be associated with the individual program levels if the processor essentially serves to fulfill service tasks. Such a service processor generally is in charge of the tasks of initial program loading, error detection and diagnosis, operating particular system components, such as a console with keyboard and display units, and, in the case of more sophisticated data processing systems, of system restructuring. The aforementioned tasks which such service processors have to fulfill are by no means exhaustive but are merely an excerpt from a catalogue of tasks that can be entrusted to service processors.

In the example of FIG. 3 the program level 0 with the highest priority accommodates all microprograms for analyzing and handling processor errors (EA) detected by error check circuits.

The program level 1 which can be activated by errors (PSF) in the internal power supply serves to switch off the different internal power supply units, following a particular sequence.

Program level 2 accommodates the microprogram associated with a remote service terminal (RS), by means of which a service processor arranged in a service station can be connected for remote service purposes, via modems or similar communication adaptors, to corresponding other processors which can be linked thereby in a star configuration to a central service processor.

Program level 3 contains, for example, microprograms for operating the keyboard and display (DISPL) of a processor console.

Program level 4 contains the microprograms of a bus adaptor (BBA), via which the service processor is connectable to other parts of an associated processing system.

The microprogram for operating, for example, a diskette (DISK) for collecting error data for diagnostic and maintenance purposes is on program level 5, as shown in FIG. 3.

The microprograms for testing the system status (SYST) and for measuring the internal operating voltages occupy program level 6.

Finally, all transient microprograms (TRANS) are accommodated on the lowest level 7.

The various processes, which are mentioned here only briefly, can operate in parallel, i.e., asynchronously, so that their requests to the associated microprograms can become active asynchronously in respect to the microprogram currently being executed.

A request with highest priority is entitled to interrupt a currently executing program of lower priority between the execution of one micro instruction and the retrieval of the next sequential micro instruction. The address of the next micro instruction and the last valid condition code as well as the full appertaining local storage contents are preserved until the interrupted program is resumed.

Generally, this means that as new external, asynchronous requests occur, or after a program level has been serviced, a renewed priority check must be made to determine which currently active request thas the highest priority, so that the request concerned can be assigned control of the processor.

Thus, the microprograms executing on the different program levels can competitively acquire control of the processor. This method which is generally employed for processors operating according to the second principle, i.e., interruption driven processors, has three serious disadvantages:

It is highly susceptible to faults and defects, since faulty asynchronous requests which may be caused by faulty circuits may cause displacement of current programs in accordance with their priority, and produce secondary effects by erroneously called programs.

A "stationary state" is difficult to predict or cannot be predicted at all, so that this method leads to unforeseeable "overflows".

Errors caused by circuits or microprograms are very difficult to analyze in this "uncontrolled" arrangement and require a considerable amount of time.

The object of this invention is to eliminate the foregoing disadvantages. External requests are not permitted to cause asynchronous interruptions. In the case of accepted interruptions (program changes) only particular control blocks and not the microprograms proper are changed. In addition, the control blocks associated with a higher level program language are organized to determine the instruction types and storage areas permissible for the respective program level.

In accordance with the invention, this problem is solved by means of the features described and claimed herein.

Other advantages, embodiments, developments and features of the subject matter of this invention may be understood from the description and claims.

By means of the invention essentially two advantages are obtained:

1. External interruption requests such as requests by input/output units, which conventionally would be accepted on an asynchronous basis, may be masked out of contention during the execution of other programs.

2. The switching of the control blocks associated with the passage of control between individual program levels may be effected synchronously at a particular predetermined stage in the interpretation phase of an instruction in the program which is to be interrupted.

SUMMARY OF THE INVENTION

In a data processing system in which status switching operations are performed in response to selected interruption requests--each switching operation saving status relative to an "in-process" program level and preparing status relative to a program level associated with the selected request--and in which the processing of each instruction includes interpretation and execution operations spanning a plurality of microcycle intervals of predetermined duration, each switching operation is conditioned on a master mask signal generated in a selected one of the interpretation microcycles, and each such master mask signal has a duration of only one microcycle. Accordingly, the status switching function may be accomplished during the processing of instructions in a manner entirely transparent to the program level software of the system.

Furthermore, in each pre-arranged microcycle of master mask generation the instruction processing controls consecutively generate a series of three command signals; one to control the generation of the master mask signal, a second to control the conditional saving of status relative to the program level currently in process (conditional on the selection of an unmasked interruption request), and a third to control conditional preparation of status relative to the program level which is to be processed (after the execution of the current instruction is completed).

The apparatus associated with execution of the switching operations comprises means for storing a plurality of common mask bits variously having enabling and disabling states, one such bit associated with each program level and information request source, and means for limiting the potential selection of interruption requests during master mask generation to only those requests associated with common mask bits having enabling states. Furthermore, the instruction processing controls are adaptable to generate a fourth type of command, in conjunction with a variable configuration of new common mask, bits for varying the configuration of stored common mask bits while an instruction is being processed; whereby during the processing of an instruction in one program level the stored common mask bits associated with selected ones of the higher priority levels may be disabled (in order to block interruptions in behalf of the latter levels), and whereby later, for instance during processing of another instruction in the same one level, the same controls can re-enable previously disabled common mask bits (to permit interruptions in behalf of the associated levels).

The apparatus for performing the switching operations also comprises means for storing a plurality of binary-valued request bits having on and off states, one for each level; the bits in "on" states effectively representing interruption requests in behalf of associated levels. Furthermore the system is organized to be able to generate a fifth type of command, in conjunction with a variable configuration of information bits, for storing a new configuration of request bits at a predetermined microcycle stage of processing; whereby the state of the request bit associated with any level can be varied in a predetermined synchronous relation to the processing of instructions in either the same level or other levels. In respect to this feature the system also includes an interval counter which may be set to a predetermined initial count value during the execution processing of an instruction in a given program level, decremented by unit value amounts during subsequent interpretation processing of any instruction in any level, and tested for a predetermined final value during the same interpretation processing steps. When the final value is detected the request bit associated with the given level is set to an enabling condition (by a fifth type command), thereby manifesting an interruption request relative to the given level.

The apparatus for performing the switching operation also includes a plurality of registers for saving status, one register for each program level, a single "current status" register for storing status relative to the program levels currently in process and next to be processed, means conditioned by the master mask signals and interruption requests for selecting a highest priority currently manifested interruption request, means responsive to the selected request for generating associated "leave" and "start" signals, means responsive to a leave signal in conjunction with a command generated by the instruction processing controls for transferring the current status register contents to a saving register associated with the program level currently being processed, and means responsive to a start signal in conjunction with another command for transferring status information from a saving register associated with a new program level to be processed; the last two transfers being characterized in that both are completed during a single microcycle of instruction processing.

BRIEF DESCRIPTION OF THE DRAWINGS

The invention will be described in detail below by means of an embodiment illustrated in the drawings.

FIG. 3 is a representation of possible program levels in a typical environmental system and their priority level allocation, FIG. 4 is the block diagram of the control signal generator 203 shown in FIG. 1, FIG. 7 is a block diagram of the program level switch 201 shown in FIG. 1.

FIG. 1 is a block diagram of an arrangement for permitting program interruption and controlling priority-dependent program level switching in accordance with the invention. The illustrated arrangement consists of a program level switch 201 (PL-SW), controls 202 (PL-SW-C) for said program level switch, control signal generator 203 (CSG), sequence controls 204 (SC), a main data processing complex 200 (MDPC) connected to controls 204 and switch 201.

A vital element in this arrangement is the program level switch 201 which, as will be described in greater detail in connection with FIG. 2, effects synchronous program level switching relative to main complex 200 in response to asynchronous requests.

For this purpose controls 202 generate control signals selectively on inputs to switch 201 designated ST-PL0 to ST-PL7 and LV-PL0 to LV-PL7. Switch 201 also receives timing control signals T1 and T2 which will be described in greater detail below in connection with the detailed description of the switch.

Figure 1:
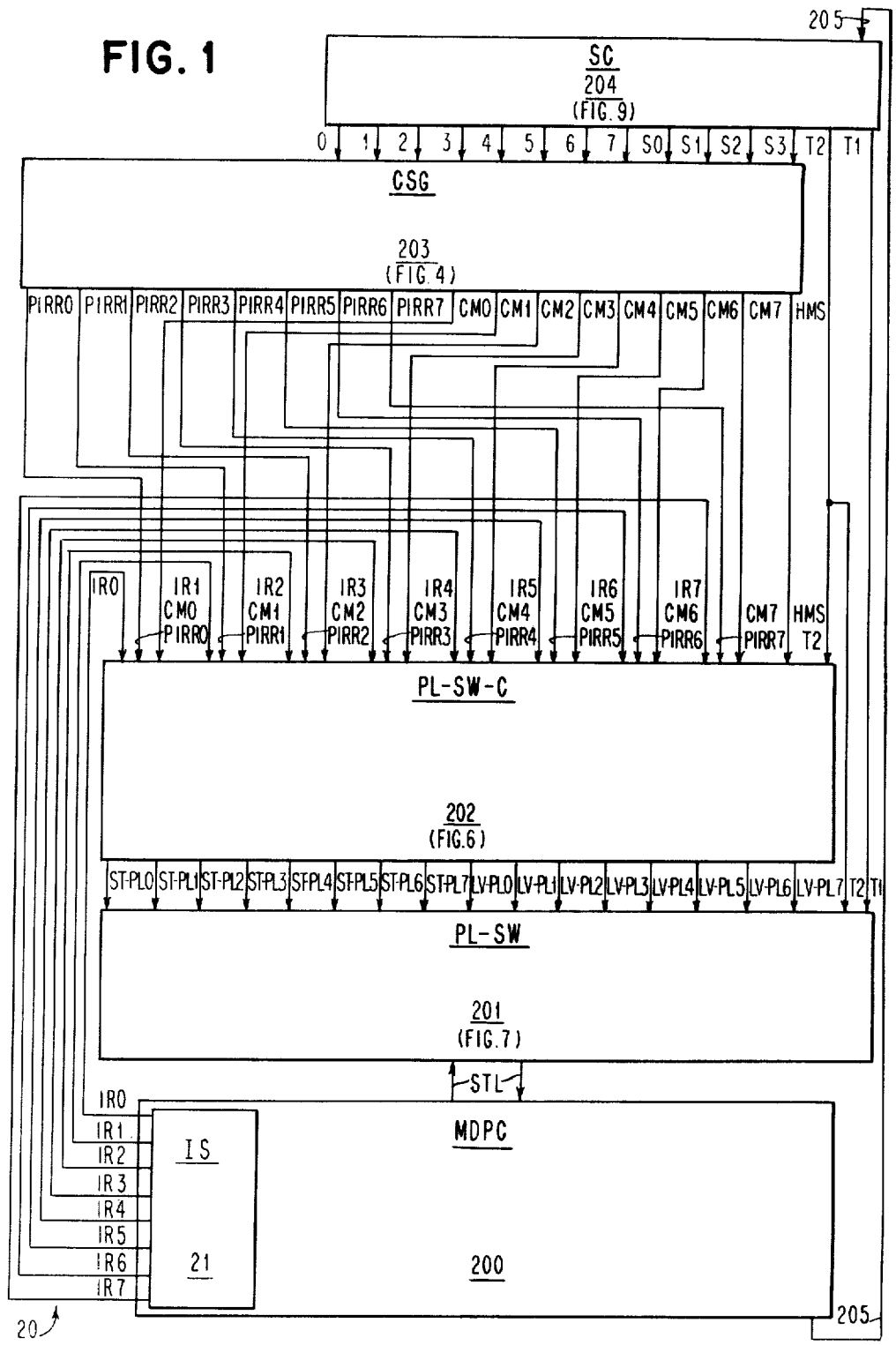
FIG. 1 is a block diagram of the subject program level interruption arrangement as well as of its connection to the main data processing complex.

As shown in FIG. 1, the controls 202 for switch 201 also require control signals on a series of respective inputs, which are supplied in part through a cable 20 from the main data processing complex 200 and in part from the control signal generator 203. Control signal generator 203 supplies control signals PIRR0 to PIRR7, CM0 to CM7 and HMS. These control signals are derived from bit signals 0 to 7, control signals S0 to S3, and clock signals T1 and T2 developed by the sequence controls 204. The signals supplied by sequence controls 204 derive from instructions which are transferred, via the control line 205, from the main data processing complex 200 to the sequence control 204.

The circuits and operation of sequence control 204 will be described in detail below in connection with the discussion of FIG. 9.

Figure 2:
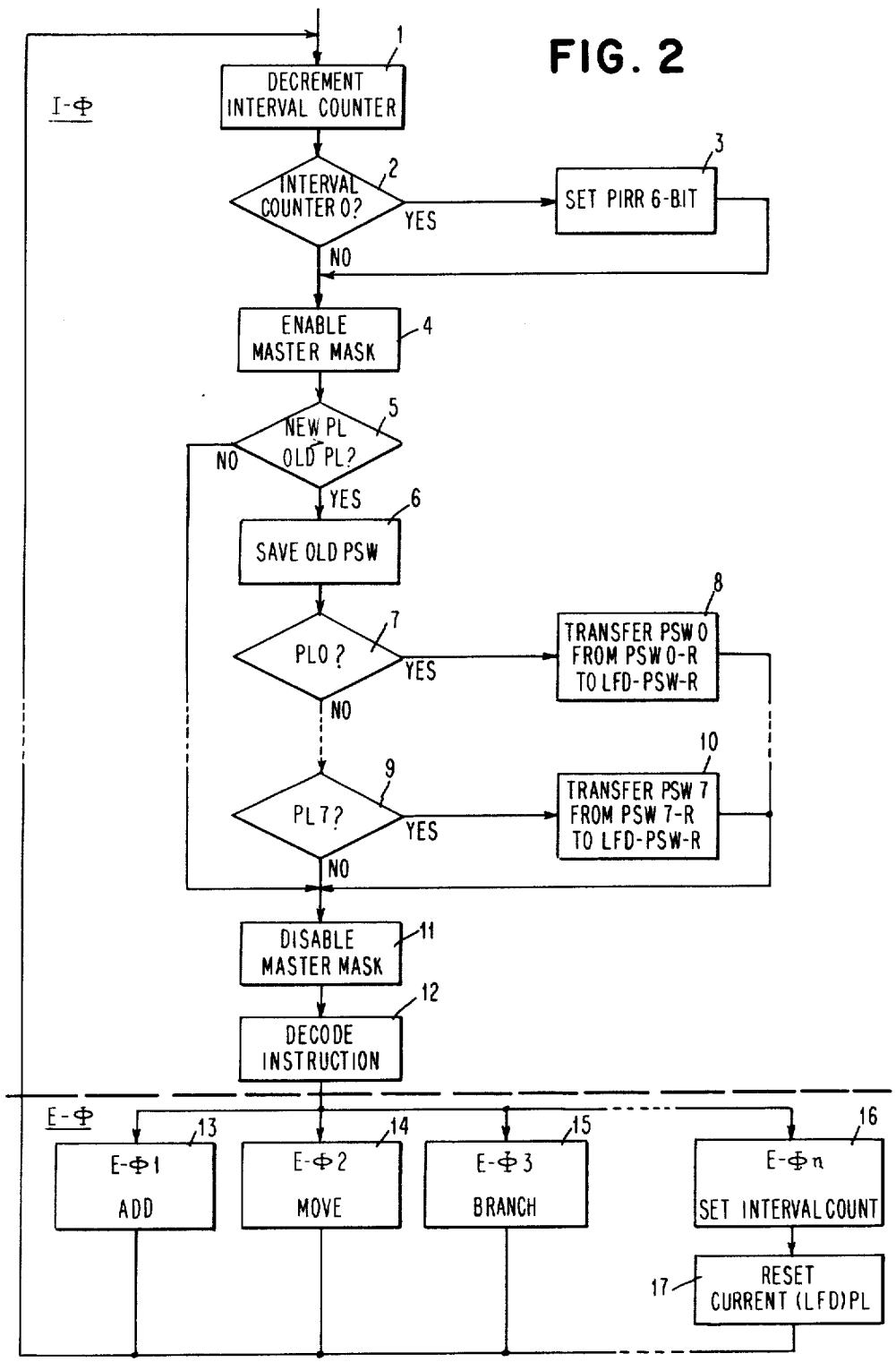
FIG. 2 is the block diagram of a flow chart illustrating the necessary control functions during the interpretation and execution phases of instruction processing for implementing or suppressing a program level change.

FIG. 2 shows a section of the interpreter which, as is generally the case, controls the program cycle in a sequence of interpretation and execution phases, each interpretation phase I-Φ being followed by an execution phase E-Φ. The upper part of FIG. 2 shows an operation at 4, for activating a master mask HM which controls the transfer of control between the program levels 0 to 7 shown in FIG. 3. Which program is finally allocated control of the machine at a particular time depends upon the interruption requests, both external and programmed, which are active and on special conditions which are still to be described.

The various interrupt requests, with which the previously mentioned program levels are associated, are receivable only at one point in the interpreter operation, which, as indicated above, is the point of master mask enablement specified under operation 4 in FIG. 2. In this example two consecutively executed micro instructions are involved, the master mask (HM) being switched on for the duration of the first microinstruction and then immediately switched off. With this master mask the reception of interrupt requests generally, i.e., the switching between program levels, can be selectively suppressed and allowed. Thus the program handling of asynchronous interruption requests is made synchronous since the master mask is activated only for the duration of execution of one particular microinstruction (in the microprogram for the program level currently in control). The different tasks EA to TRANS (FIG. 3) of the eight program levels are carried out by one interpreter. To obtain this, instruction addresses associated with these levels are made available to the interpreter by means of the program status words PSW associated with the different program levels.

The interrupt requests may be requests from the externally connected peripheral units, the so-called input-/output units, as well as requests which are triggered by programs.

In the present example it is assumed that an internal monitoring program on program level PL6 is to start automatically after a particular number of interpreter runs. To achieve this, the last instruction for each program level currently in control is arranged to condition an interval counter to be decremented after each "run" of the associated program through the interpreter has concluded (cf. the operations illustrated in FIG. 2 at 16, 17 and 1).

After each decrementation of this interval counter, represented as operation 1 in FIG. 2, its value is tested to determine if the value 0 has been reached (cf. operation 2 in FIG. 2). If it has a request for program level PL6 is activated by means of the associated programmed interrupt request PIRR6. This function is shown as operation 3 in FIG. 2.

Independent of this process, the master mask HM is activated, permitting acceptance of interruption and switching of program levels only at this point of execution in the interpreter sequence. This is indicated by operation 4 in FIG. 2.

If the program level currently in control has a priority level lower than a new interrupt request that may have become active (since the previous activation of HM) the program status word LFD-PSW of the current program level is stored, and the program status word of the program level associated with the new request is placed in control (cf. operations 5 and 6 in FIG. 2).

As shown in operations 7 to 10, the program levels are handled in accordance with associated priority levels, the highest priority being associated with program level 0 (PL0) and the lowest with program level 7 (PL7).

After the priority level of the interrupt requests has been checked, the master mask HM is deactivated, as shown at 11 in FIG. 2, and normal instruction processing resumes. As shown at 12, this starts with the decoding of another instruction and is followed by the execution phases E-Φ 1, E-Φ 2, E-Φ 3 . . . (cf. operations 13 to 15).

As suggested above, the interval counter is set in the last execution phase of an instruction in the program level currently in control and that level is returned to control (cf. operations 16, 17 and 1).

It will be seen from the flow diagram that after deactivation of the master mask the subsequent execution of an interpretation instruction proceeds without interruptions. Only after an interpretation instruction has been completely executed can a new program level switch be effected in the subsequent I-phase.

A special feature of this sequence is that in the execution phase of the last interpreting instruction in each program level that program level is switched off (operation 17) by erasing its interrupt request (IR or PIRR).

In the execution phase of its last interpreting instruction the program level PL6, as previously mentioned, resets the interval counter to its initial value (operation 16).

This special sequence, which prevents asynchronous program interruptions and program level switches during the interpretation of programs and which permits the synchronous switching of control blocks associated with the individual levels at a designated point in the so-called I-phase of the interpreter, is controlled by the circuit arrangements shown in FIGS. 4, 6A to 6D, 7 and 9. These arrangements are necessary in addition to the circuits existing in the data processing system employed.

FIG. 4 shows the circuits 203 for generating the control signals PIRR0 to PIRR7 and CM0 to CM7, which serve as input signals for the control circuits 202 shown in FIGS. 6A to 6D, and control the synchronous switching to respective program levels.

The program interrupt request sources IS in the data processing system 200, which by means of their interrupt request signals IR0 to IR7 causes the program sequence to be continually changed, are shown as block 21 in FIG. 1. Via individual lines of the cable 20 they transfer their interrupt request signals IR0 to IR7 to the controls 202 detailed in FIGS. 6A to 6D.

This first group of interrupt request signals IR0 to IR7 can be generated by special adapter circuits which are not shown in detail. As will be illustrated by means of later embodiments, these interrupt request signals IR0 to IR7 can also be reset by the sequence control (of the main complex 200).

The second group of control signals, whose generation is shown in FIG. 4, are the control signals PIRR0 to PIRR7 which can be set and reset by the sequence control 204. Referring to FIG. 4 control signal S0 enables AND gates 22a to 22h to set register 1 (23) with bits 0 to 7 supplied by sequence controls 204. These bits are supplied to sequence control 204 together with control commands by the sequence controls of main data processing complex 200. Bits 0 to 7 in register 23, together with the control signal S1 which like the control signal S0 is generated by the sequence control, serve to set respective flip-flops 0 to 7 shown at 25a to 25h. These flip-flops produce respective control signals PIRR0 to PIRR7.

Accordingly control signal S0 operates AND gates 22a to 22h to transfer the bits 0 to 7 to register 23 for temporary storage, and control signal S1 operates AND gates 24a to 24h, to transfer the bits temporarily stored in register 23 to effect setting of respective PIRR flip-flops 0 to 7 (25a to 25h). Only those PIRR flip-flops which are set will produce the desired control signal (PIRR0 to PIRR7) on their outputs.

The required third group of control signals CM0 to CM7 are produced by an identically designed arrangement consisting of AND gates 26a to 26h feeding a register 2 (27) and AND gates 28a to 28h feeding respective latching flip-flops 29a to 29h. The control signal S0, which as previously mentioned is generated by the sequence control at the times shown in FIG. 5, operates AND gates 26a to 26h at such times to transfer the bits 0 to 7 into register 2 (27). The control signal S2 transfers the contents of said register to individual latch circuits CM-FL0 to CM-FL7 (29a to 29h) via respective AND gates 28a to 28h. The outputs of these latches form the control signals CM0 to CM7 which assume an important control function in the operation of program level switching control circuits 202 as will be seen in the discussion of FIGS. 6A to 6D.

Finally, FIG. 4 shows that the control signal S3, also generated by the sequence control 204 (at times shown in FIG. 5), sets a master mask flip-flop 30 (HM-FL) which in the set state provides the output signal HMS.

The effects of the signals IR0 to IR7, PIRR0 to PIRR7, CM0 to CM7 and HMS will be described in greater detail in connection with FIGS. 5 and 6A to 6D.

Once again it is observed that attendance to the asynchronously received interrupt requests represented by the signals IR0 to IR7 is synchronized by means of the master mask HM in the so-called I-phase of the interpreter in that the master mask signal HMS is activated for a short time only at this point.

FIGS. 6A to 6D show the circuit arrangement 202 for program level selection. In this circuit arrangement the asynchronously generated interrupt requests IR0 to IR7 are received subject to control of the master mask HMS and, with the master mask activated, are selected in accordance with their priority. The interrupt request with the highest priority generates an associated start signal ST-PLi which, for a limited period of time, assigns control of the main data processing system to the associated program level PLi via an associated operation in the program level switch (FIG. 7) as will be described in greater detail below.

A program switch, from a program at one level to one at a higher priority level, requires a circuit arrangement for terminating operation of the first program and for saving its last valid program status word LFD-PSW in the associated program status word register PSWi-R (FIG. 7). This circuit arrangement, shown in FIGS. 6A to 6D, generates the signals LV-PL0 to LV-PL7 which control input access to respective registers PSW0-R to PSW7-R (FIG. 7).

Figure 8:
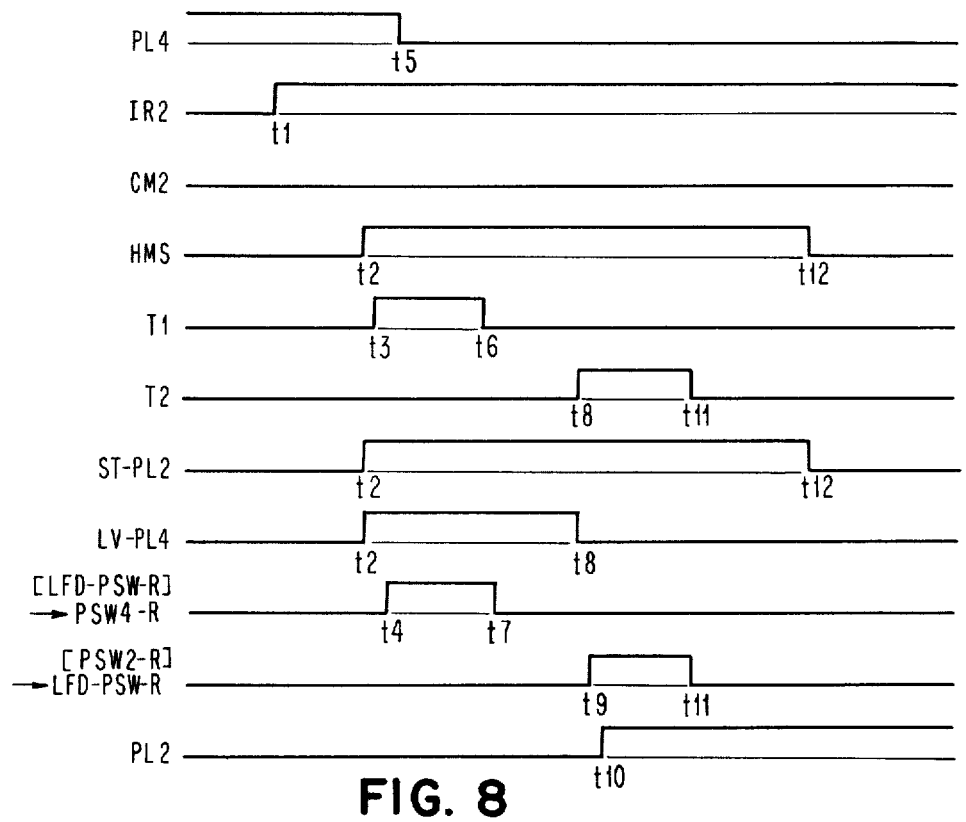
FIG. 8 is a timing diagram illustrating the operation of the program level switch 201 during program level switching.

For explaining the operation of said circuit arrangement the following example is best suited. In this example it is assumed that program level PL4 is active (i.e., currently in control) and that the common mask control function CM2, for program level PL2, is activated (i.e., enabling). FIG. 8, a time diagram of a program level shift, depicts in the second line from the top the asynchronous occurrence of a request, represented by the interrupt request signal IR2, for activation of program level PL2. As shown in FIG. 8, this interrupt request does not immediately evoke a program level change in spite of its priority, which is two levels higher than that of program level PL4, because the master mask signal HMS is not activated at that stage.

In the next I-phase of the interpreter the master mask HM is activated, generating the signal HMS (previously described in connection with FIG. 4) and thereby permitting a program level change if a higher priority unmasked interrupt request is active.

The circuit arrangement for selecting the program level to be activated, as shown in FIGS. 6A to 6D, consists of a set of OR gates 60a to 60h, a first set of AND gates 70a to 70h, a second set of AND gates 80a to 80g, a third set of AND gates 90a to 90h, a set of flip-flop circuits 100a to 100h, a fourth set of AND gates 110a to 110h, and a single OR gate 87.

AND gates 70a and 80a to 80g respectively generate program level start signals ST-PL0 to ST-PL7 when their respective input conditions are fulfilled. AND gate 70a, associated with the highest priority program level PL0, generates the signal ST-PL0 if the input signals IR0 or PIRR0 and CM0 are present. When ST-PL0 is effective the inhibit signal on the right side output of AND 70a, representing the inverse of ST-PL0, is effective and prevents AND gates 80a to 80g, associated respectively with AND gates 70b to 70h from producing associated program level start signals ST-PL1 to ST-PL7. "Inhibit signals", in reference to "right side" outputs of AND gates 70a to 70g in this and following context, means the inverse of the "left side" output of the respective AND gates 70a to 70g. Each inhibit signal is a binary zero when the associated AND gate is open (operated) and a binary one when it is closed (unoperated). These signals are also generally referred to as $\overline{ST-PL0}$ to $\overline{ST-PL7}$.

Also required for a program level change are the control signals LV-PL0 to LV-PL7 for leaving the current program level. These are generated by the fourth set of AND gates 110a to 110h. These AND gates are controlled by respective flip-flops 100a to 100h which are set by respective control signals ST-PL0 to ST-PL7. These flip-flops are reset via respective AND gates 90a to 90h at the time of the clock signal T2.

Figure 5:
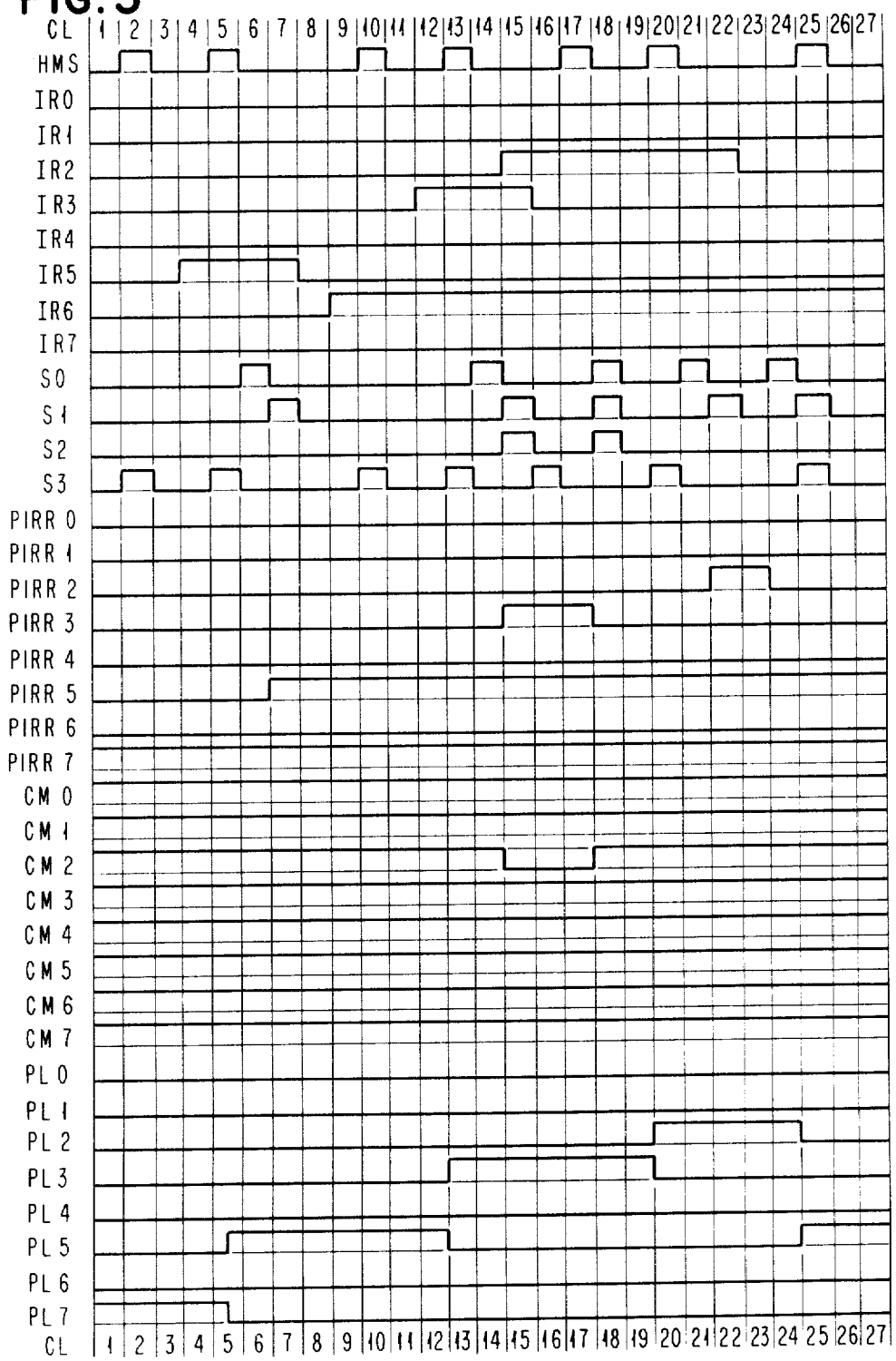
FIG. 5 is a timing diagram illustrating the operation of the arrangement shown in FIG. 1, FIGS. 6A to 6D configured as shown in FIG. 6 represent a block diagram of the controls 202 for the program level switch illustrated in FIG. 1.

FIG. 5 in connection with FIGS. 6A to 6D shows a further example which serves to explain an operating cycle of the individual components of the circuit arrangements.

As shown in FIG. 5, it is assumed in this example that bits CM0 to CM7 of the common mask and bit PIRR7 are set, bit PIRR7 representing an active program level PL7. The various signals generated by the control circuit in this circumstance correspond to the configuration shown at clock time CL1 in FIG. 5.

Within the illustrated periods of the clock shown as clock times CL1 to CL27 the master mask signal HMS selects those significant points in time (CL2, 5, 10, 13, 17, 20, and 25) at which program level changes can take place, depending upon internal or external conditions. The detailed time sequence during a program level change will be referred to later in connection with the previously mentioned first example (FIG. 8).

A first possible program level change could take place at clock time CL2. However as there are no other interrupt requests, as indicated by signals IR0 to IR7 being inactive and only control signal PIRR7 being active, the program level PL7 (i.e., the program level with the lowest priority) remains in control of the main data processing system and will not be interrupted at this time.

During clock time CL3 an interrupt request triggered by one of the interrupt request sources 21 causes interrupt request signal IR5 to become active at the start of CL4.

During clock time CL4 no program level change can take place, since the master mask signal HMS is not activated at this time.

The master mask signal HMS is next activated at clock time CL5, when the control signal S3 conditions the master mask flip-flop 30 (FIG. 4) for the duration only of that clock time. The master mask flip-flop 30 can be, for example, a monostable multivibrator, whose unstable phase approximately corresponds to the duration of a clock time. FIG. 5 shows further that bits CM0 to CM7 of the common mask are enabling at this time. Consequently bit CM5 permits a program level change to be made from program level PL7 to program level PL5.

In the circuit arrangement of FIGS. 6A to 6D these processes occur as follows. Initially, i.e., at the start of clock time CL1, a program level selection takes place, by means of which program status word PSW7 becomes the current PSW. The main data processing system 200 (FIG. 1) is thereby controlled by instructions of program level PL7. The circuits shown in FIG. 4 generate bit PIRR7, as an output of PIRR flip-flop 25h, which is transferred through OR gate 60h (FIG. 6B) partly conditioning AND circuit 70h. The active control bit CM7 of the common mask further enables AND gate 70h. Consequently the next master mask signal at clock time CL2 opens (operates) AND gate 70h for the duration of clock time CL2. The AND gates 70a to 70h of the first set of AND gates each have two outputs, the left one of which, with the AND condition being fulfilled, generates the signal ST-PLi for starting the new program level, while the right output simultaneously generates the inverse signal $\overline{ST-PLi}$ for inhibiting lower priority gates in the set 80a and 80g.

AND gate 80g is conditioned by the "left" output of AND gate 70h and the right ("inhibiting") outputs of the AND gates 70a to 70g. As at the same clock time CL2 during which the master mask is activated no other AND gate 70a to 70g is operated, only the AND condition for AND gate 80g of the second set of AND gates 80a to 80g is fulfilled and therefore only said AND gate 80g can generate its associated output signal ST-PL7 (FIG. 6B). In the circuit arrangement of FIGS. 6A to 6D, in which the signals LV-PL0 to LV-PL7 for leaving the current program level are generated, the output of only AND gate 80g at this time permits only flip-flop 100h to be set thereby preparing only the associated AND gate 110h to generate only the signal LV-PL7 at that state. As a result of this the program status word PSW7 of program level PL7 again becomes the current program status word LFD-PSW, as will be described in detail in connection with FIGS. 7 and 8. Thus, there is no program level change and program level PL7 remains the current program level.

At clock time CL4 the interrupt request signal IR5 is emitted and from time onwards is available to act through OR gate 60f. At that stage the PIRR5 bit logically dependent on S1 is not yet set. Bit CM5 and all other bits of the common mask are still switched on. Thus, AND gate 70f is conditioned to be opened upon the occurrence of the next master mask signal HMS. At clock time CL4, as is also shown in FIG. 5, there are no other status changes.

The master mask signal HMS is generated only at clock time CL5 via the control signal S3, the duration of the former signal corresponding to the duration of activation of the master mask HM. At this time AND gate 70f is opened causing the AND conditions for AND gate 80e to be fulfilled and inhibiting AND gate 80g. Consequently ST-PL5 is generated for the duration of CL5. The earlier terminal transition of ST-PL7 caused flip-flop 100h to be set enabling AND gate 110h, previously prepared by the output of OR gate 87 (FIG. 6B), to generate the signal LV-PL7 for controlling the saving of program level 7 status as discussed below in reference to FIG. 7. At the next T2 time AND gate 90h will reset flip-flop 100h to terminate LV-PL7. In like manner the terminal transition of ST-PL5 at the end of CL5 sets flip-flop 100f enabling AND gate 110f to produce LV-PL5 for thereafter preserving level 5 status.

As illustrated in FIG. 7, at the next T1 time LV-PL7 causes the current program status word LFD-PSW belonging to program level PL7 to be transferred from register 130*i* to its associated register 130*h*, via AND gates 140*i* and 120*h*, and at T2 time ST-PL5 causes the program status word PSW5 of program level PL5 to be transferred from the corresponding register 130*f* through AND gates 140*f* and 120*i* and become the current program status word by being transferred into the associated register 130*i* for the current program status word. This means that roughly from the middle of clock time CL5 the instructions of program level PL5 will have taken over machine control.

The program level change was possible, because the activation of AND gate 70*f* caused the control signal ST-PL5 to be switched off, inhibiting AND gate 80*g* (FIG. 6B) and thereby preventing subsequent issuance of ST-PL7 and setting of flip-flop 100*h*.

After the program level change, as shown in FIG. 5, program level PL5 becomes active from about the middle of clock time CL5. At clock time CL6 control signal S0 is activated causing bits 0 to 7 generated by the sequence control 204 to be transferred into register 23 (FIG. 4) via AND gates 22*a* to 22*h* (FIG. 4). At the next clock time CL7 control signal S1 is generated and acts in conjunction with bit 5, which was transferred into register 23 in the preceding clock cycle, to set flip-flop 25*f* via AND gate 24*f*. Flip-flop 25*f* generates the PIRR5 bit. As shown in FIG. 5, said PIRR5 bit is available shortly after the start of clock time CL7.

In the course of clock time CL8 the interrupt request signal IR5 from the associated interrupt source 21 is switched off, as the system part associated with said interrupt source no longer requires special machine attendance.

Instead said interrupt source 21 communicates another interrupt request at clock time CL9 by generating the signal IR6. Initially, the latter signal remains ineffective, because a program level change is possible only the next time the master mask HM is activated. According to FIG. 5, the earliest time for this is the clock time CL10 at which the control signal HMS is again generated (refer to FIG. 5). Although at that stage the interrupt request signal IR5 is no longer present, a program level change to the next lower program level PL6 cannot be effected, since the PIRR5 bit set in time CL7 has assumed the function of the control signal IR5. Thus, at clock time CL10 there is no program level change, and there is also no change at clock time CL11, as shown in FIG. 5. At clock time CL12 interrupt source 21 activates interrupt request signal IR3 having highest activated priority at that stage.

At clock time CL13 the master mask which is the only means to effect a program level change is again activated. At said clock time the following signals are active: HMS, IR3, IR6, S3, PIRR5, PIRR7, and all bits CM0 to CM7 of the common mask.

Shortly after activation of the master mask the higher priority of the source associated with the interrupt request signal IR3 causes control, to be switched from program level PL5 to program level PL3.

In the circuit arrangement of FIGS. 6A to 6D this situation presents itself as follows:

Upon occurrence of the master mask signal HMS in CL10 the AND conditions for AND gate 70*f* remain initially fulfilled, even with a switched off interrupt request signal IR5, since at that time the PIRR5 bit in its "1" position is applied via OR gate 60*f*. Thus, when the master mask HM is activated the AND condition for AND gate 80*e* is fulfilled, as none of the preceding AND gates 70*a* to 70*e* is active, and a program change cannot take place.

At clock time CL12 interrupt request signal IR3 is activated and acts through OR gate 60*d* to prepare AND gate 70*d*. Bit CM3, which is then in its "1" position, is also applied to said AND gate. Consequently, upon the next occurrence of the master mask signal at clock time CL13 the AND gate 70*d* is switched, opening the connected AND gate 80*c* which then generates the signal ST-PL3. Via the flip-flop 100*f* and the AND gate 110*f* as well as via the flip-flop 100*d* and the AND gate 110*d* a program level change is effected in the manner described above.

At clock time CL14 the control signal S0 is again generated. With the aid of said control signal new bits 0 to 7 are loaded into register 23. As a result of the subsequent S1 signal the selected flip-flop 25*d* is set at clock time CL15, said selected flip-flop subsequently generating the PIRR3 bit.

A very advantageous operating sequence of the circuit arrangement shown in FIGS. 4, 6A to 6D will be described below.

As previously mentioned in connection with FIG. 5, a program level change from PL5 to PL3 takes place at clock time CL13. As the program of program level PL3 does not want to be interrupted by interrupt requests from an interrupt source controlled, for example, by a program of program level PL2, the program of level PL3 at the start of clock time CL15 until the start of clock time CL18 switches off the bit CM2 of the common mask, which is associated with program level PL2.

In the circuit arrangement in accordance with FIGS. 6A to 6D it is shown that an interrupt request signal IR2 applied to AND gate 70*c* via OR gate 60*c* is ineffective the next time the master mask signal HMS occurs, as the third condition for the AND gate 70*c* is not fulfilled, because signal CM2 is missing. In this manner the program in level PL3 protects itself against being interrupted by an interrupt request from said interrupt source for the period of time indicated.

At the start of clock time CL18 new bits 0 to 7 are entered into the registers 23 and 27 with the aid of signal S0. At this clock time S2 causes the flip-flop 29*c* in FIG. 4 to be set, because bit 2 was entered into register 27 by S0. Said flip-flop 29*c* then generates the signal CM2, as previously described. This means that the next time the master mask is activated the interrupt request signal IR2 will gain control, initiating a program level change. This is effected at clock time CL20 at which the program level change from program level PL3 to PL2 finally takes place.

With the subsequent control signals S0 and S1 signal PIRR2 is generated, maintaining operation on said program level even after the interrupt request signal IR2 has been switched off.

As is also shown in the diagram of FIG. 5, the PIRR2 bit is switched off by the control signal S1 at the start of clock time CL24.

As the PIRR5 bit set at the start of clock time CL7 remains set, the interrupt request, emitted at clock time CL9 by the interrupt source generating the interrupt request signal IR6, cannot gain control; i.e., cannot initiate a program level change from program level PL2 to PL6 at clock time CL25, the next time the master mask is activated. Rather it is the signal PIRR5 which gains control, ensuring that a program of its level, i.e., program level PL5, is assigned machine control. This control is maintained until the end of clock time CL27, with which the description of this example ends.

The exchange of the program status words PS0 to PSW7 and the circuit arrangement necessary for this purpose are illustrated in FIG. 7 and will be described in greater detail below. FIG. 8 shows, by way of a time diagram, an embodiment assuming that program level PL4 is initially active and bit CM2 of the common mask is in a binary one state.

The second line from the top of FIG. 8 shows that starting at time t1, interrupt request signal IR2 becomes active and remains active thereafter.

The third line illustrates the common mask bit CM2, which is assumed to be switched on.

At time t2 signal HMS is generated, representing activation of the master mask HM, and terminates at time t12. As previously mentioned, a program level change is only possible during the duration of the signal HMS.

The control signals T1 and T2 shown in lines 5 and 6 are generated by the sequence control 204 in timed relation to signal HMS. The signal T1, for example, starts at the time t3 which is delayed slightly in relation to time t2 and lasts until time t6. The control signal T2 is generated at time t8 and lasts until time t11. It is seen that T2 is generated later than T1 but before the end of the master mask signal HMS. The times t3 and t8, marking the start of the control signals T1 and T2, are sufficiently apart from each other to ensure that register (LFD-PSW-R) 130i, which always contains the current program status word LFD-PSW, is cleared of the previous status word before a new program status word PSWi is transferred to it.

Figure 6A:
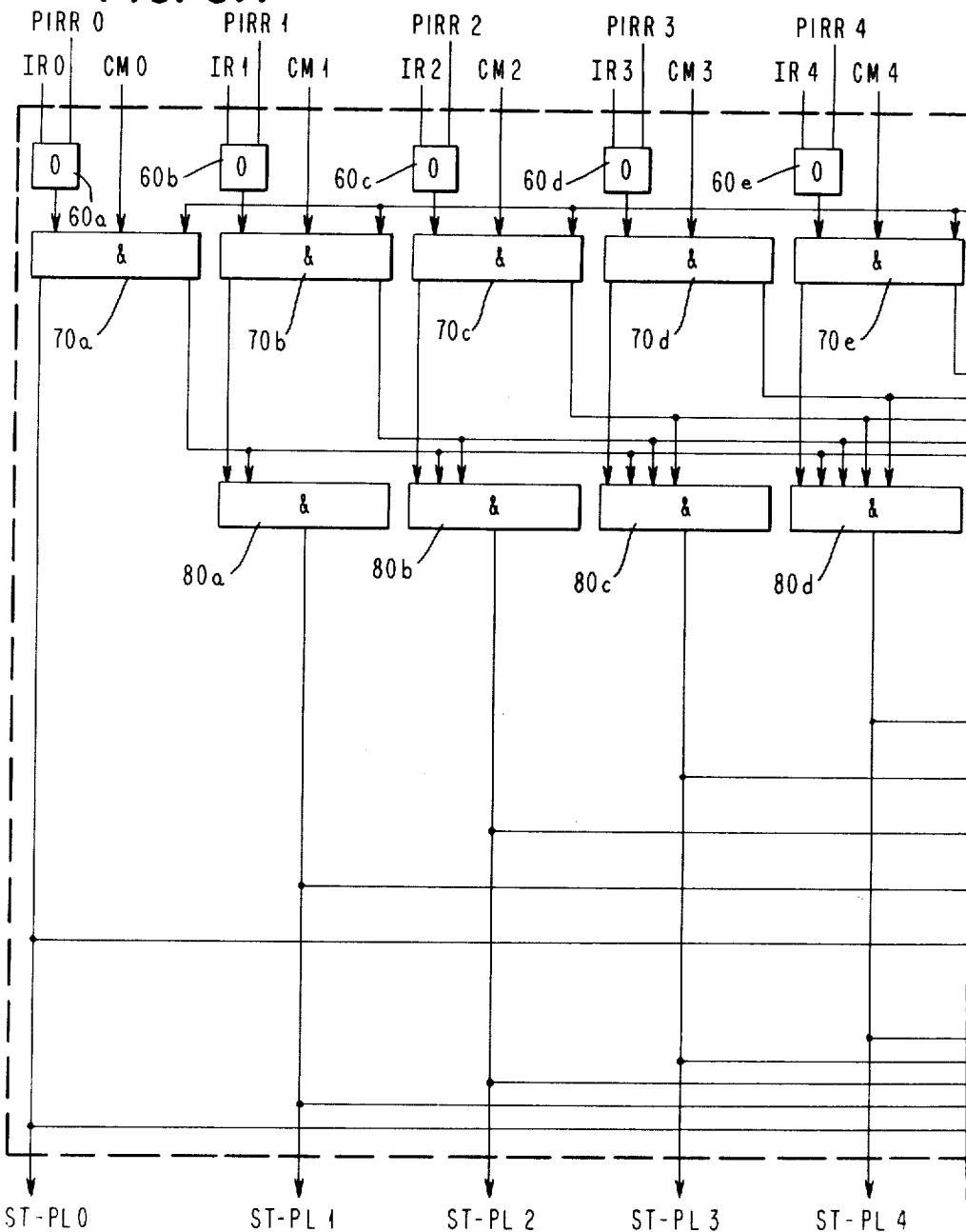
Figure 6:
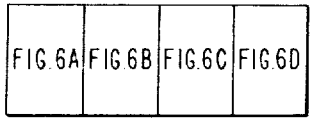
Figure 6B:
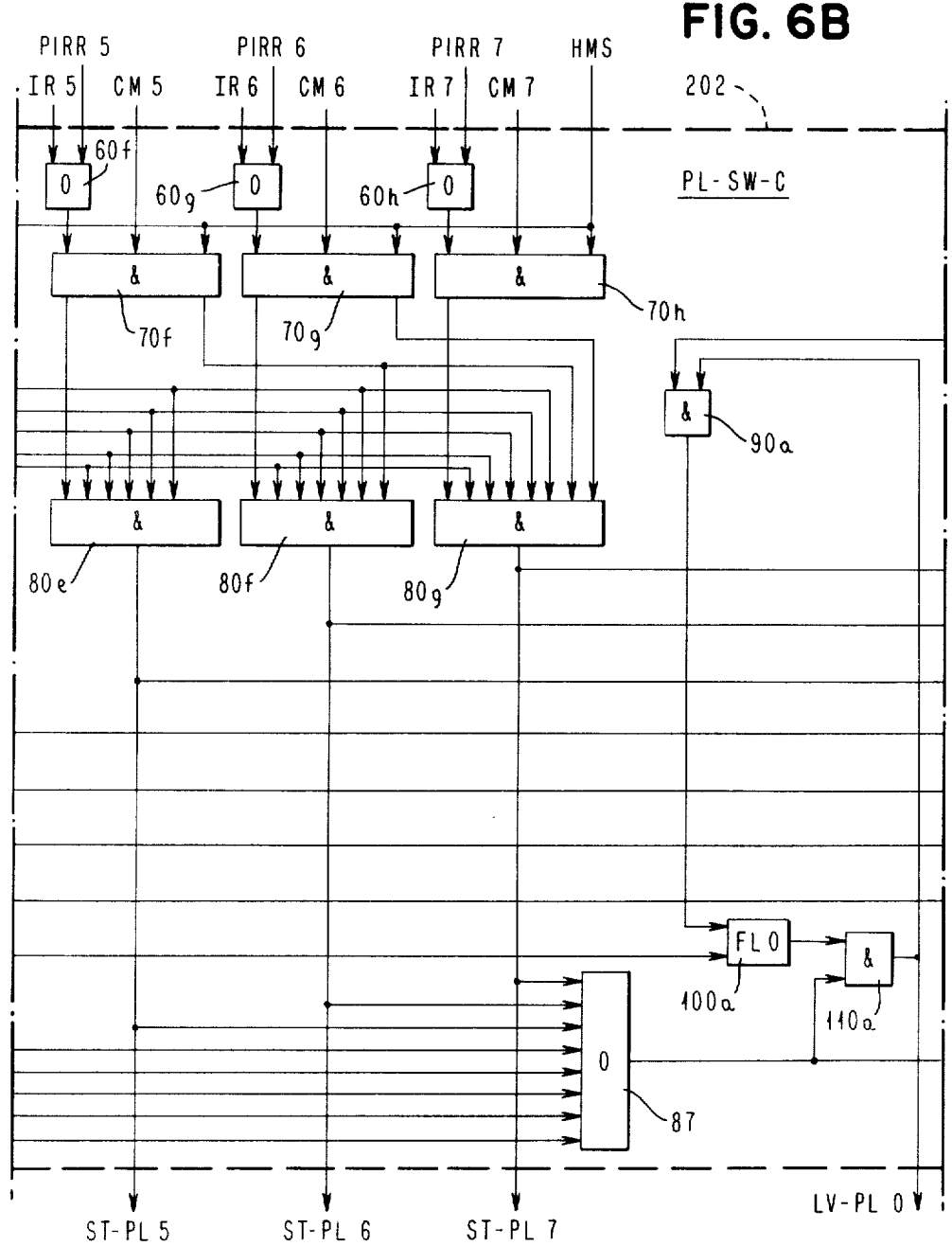
Figure 6C:
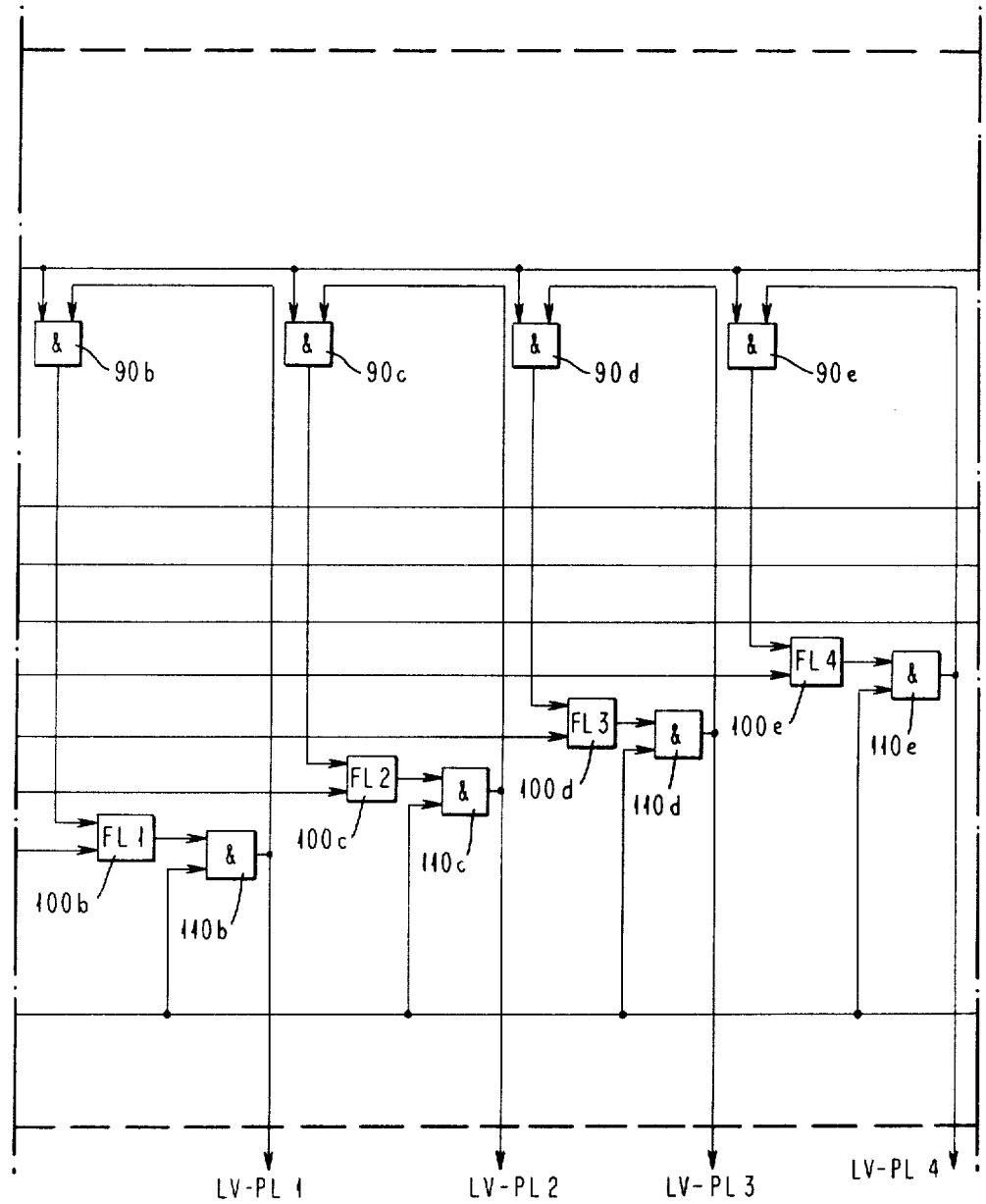

As the various conditions on AND gate 70c in FIG. 6A for a program level change from the current program level PL4 to PL2 are fulfilled, when the master mask signal HMS is received the signal ST-PL2 is generated via the AND gate 80b in the manner previously described. In the seventh line in FIG. 8 this time is indicated as t2, the same time at which the master mask signal starts. Both signals terminate at the same time t12, because the termination of the master mark signal disables AND gate 70c.

Simultaneous with the generation of signals HMS and ST-PL2 at time t2 the signal LV-PL4 is generated. Said signal indicates that the current program level PL4 may be left and is generated, as previously described in connection with FIGS. 6A to 6D, by operation of flip-flop 100e and AND gate 110e.

Flip-flop 100e can be set, because at the time the master mask HM is switched on or activated, the AND condition for AND gates 70e and 80d remain momentarily filled because of slight time delays in the operation of gate 70c. Once flip-flop 100e is set, it remains set until it is reset by the leading edge of the control signal T2 via AND gate 90e. These conditions are shown in FIG. 8 in the eighth line from the top. The time t8 for the end of signal LV-PL4, except for slight time delays, corresponds to the time t8 of the leading edge of the control signal T2.

As shown in FIG. 7, signals ST-PL0 to ST-PL7, LV-PL0 to LV-PL7, T1 and T2 play an important part in the implementation of a program level change. The central element in the circuit arrangement in accordance with FIG. 7 is the set of registers 130a (PSW0-R) to 130i (LFD-PSW-R) in which the program status words of respective program levels are temporarily stored. Said registers are loaded via a set of AND gates 120a to 120i and are read via a set of AND gates 140a to 140i.

In the assumed example the main data processing system is initially controlled by instructions from program level PL4. Thus, the current program status word for PL4 is in register 130i. A program level change from program level PL4 to program level PL2 causes control signals LV-PL4 and ST-PL2 to be generated. Subsequently, as shown in FIG. 8, the control signals T1 and T2 are generated. With signal LV-PL4 AND gate 120e is conditioned for an input transfer operation into register 130e. Upon receipt of control signal T1, the output AND gate 140i of register 130i is opened, so that the program status word for PL4 can reach the associated program status word register 130e. Thus, register 130i becomes available for receiving a new program status word as the current program status word. By means of the subsequent control signal T2, the program status word PSW2 for level PL2 is entered into register 130i from its source register 130c, via AND gate 140c which is conditioned by ST-PL2 via AND gate 120i conditioned by T2. Thus, instructions of program level PL2 control the data processing system.

As shown in FIG. 8, program level PL4 is switched off at time t5, and program level PL2 is switched on at time t10. As is also shown in this figure, transfer of the contents of the current program status word register 130i into the program status word register 130e starts at the time t4 and is completed at the time t7, and transfer of the contents of the program status word register 130c into the register 130i starts later at time t9 and is completed at time t11.

The master mask signal HMS and the signal ST-PL2 are switched off at time t12, as shown in FIG. 8.

As many electronic data processing systems have program levels which are incapable of requesting a program level change by means of interrupt request signals IRi, special measures have to be taken to ensure that such program levels can execute their programs at least occasionally.

In the above description the significance of the PIRRi bits was repeatedly stressed. Said bits maintain an interrupt request of an interrupt source effective after the associated interrupt request signal has been switched off.

To ensure that such programs are executed and proceed satisfactorily, their start must be rendered possible, irrespective of all the other program sequences. This is obtained, as previously mentioned, by using an instruction in this type of program to activate an interval counter which is thereafter decremented in the interpretation phase of instructions of other programs.

As shown at 2 in FIG. 2, in the interpretation phase of an instruction the interval counter is tested for a count of 0. If the count has reached 0 the PIRR6 bit for program level PL6 is set, as shown by function block 3 in FIG. 2. This ensures that after the program levels PL0 to PL5 have been temporarily inactive, the program level PL6 will be activated before program level PL7.

The arrangement for program level interruption described above permits the choice of or preference to be given to particular program levels for adapting without difficulties to conditions prevailing in a particular data processing system or to particular jobs to be processed in it. This adaptation is rendered possible either by programmable commands or by special control circuits. For this purpose the commands or the control signals generated by the automatic controls act on the sequence control 204 of FIG. 1, as shown in greater detail in FIG. 9.

For simplicity's sake, programmable commands, which are continually transferred, via bus 205, from the main data processing complex 200 of FIG. 1 to the sequence control 204, will be dealt with below. In minimally designed systems three types of commands suffice which can be extended to suit more complex structures both with regard to the data processing system and the problems to be solved.

Figure 9:
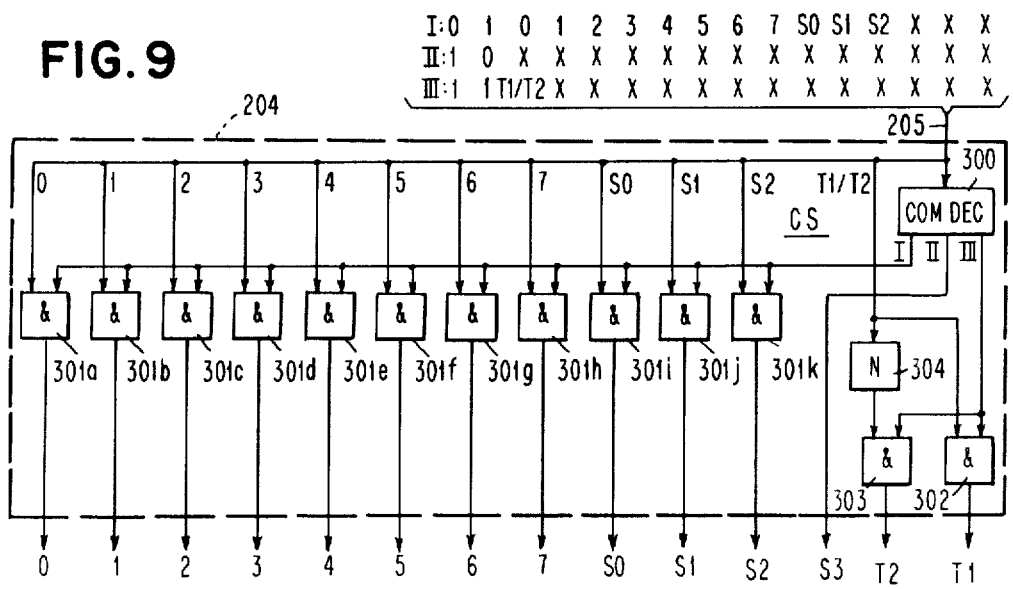
FIG. 9 is a block diagram of the sequence control 204 shown in FIG. 1.

The commands have the following format (which is also illustrated in FIG. 9):
TYPE I
  01 (01234567) S0 S1 S2 xxx
TYPE II
  10 xxxxxxxx xxxxx
TYPE III
  11 T1/T2 xxxxxxx xxxxx
(x can have arbitrary value as such positions are not effective).

To permit distinguishing between T1 and T2, in the third bit position of a type III command, T1 is associated with a binary 1 and T2 with a binary 0.

The above illustration of the different command types shows that the first two bits of each command type may be regarded as the operation code. Type I is defined by the operation code 01, type II by the operation code 10, and type III by the operation code 11.

Commands of each type are transferred in the necessary order from the main data processing complex 200 to the sequence control 204 via bus 205. Control bus 205, which in the simplest case is a multi-wire bus, is connected with its first two lines transferring the so-called operation code to a command decoder (COMDEC) 300, on whose outputs I, II, III a binary 1 is generated whenever the corresponding operation code is applied to the input of the command decoder 300.

The following 14 control buses, of which the last three can carry random signals in the case of type I, as such signals are no longer evaluated by the arrangement, are connected to an AND gate arrangement consisting of 11 AND gates 301a to 301k, each having one input connected to a respective one of the 11 bus leads and another input connected to output I of command decoder 300. The output I when active indicates that a command of type I is present. Depending upon the presence of binary input signals on the 11 bus leads, whereby the first lead is associated with the third bit position, the second lead with the fourth bit, and finally the 11th lead with the fourth but last bit position of the command, various combinations of signals 0 to 7 and control signals S0, S1 and S2 are passed through the AND gates 301a to 301k.

Decoding of the operation code of a type II command activates output II of command decoder 300 with an output signal which corresponds to a binary 1 and which directly represents the control signal S3 associated with the master mask.

Decoding of the operation code of a type III command activates output III of decoder 300 and controls evaluation of only the third bit position of the command; which bit is translated into clock signal T1, if it is a binary 1, or into clock signal T2, if it is a binary 0. The circuit arrangement consisting of the AND gates 302 and 303 as well as the negator 304 makes this decision. AND gate 302 generates on its output the clock signal T1 if the bit is a 1, and AND gate 303 generates on its output the clock signal T2 if the bit is a 0.

The control signals just mentioned are fed to the control signal generator 203 shown in FIG. 4 where they are temporarily stored for precisely determined periods of time in registers 23 and 27, and in the flip-flop stores 25a to 25h and 29a to 29h. In the registers and flip-flops said control signals in conjunction with control signals S1 to S3 serve to generate the control signals PIRR0 to PIRR7, CM0 to CM7, and HMS as required for the program level switch.

While the invention has been particularly shown and described with reference to preferred embodiments thereof, those skilled in the art will recognize that the above and other changes in form and details may be made therein without departing from the spirit and scope of the invention.

Having thus described our invention, what we claim as new, and desire to secure by Letters Patent is:

1. In a data processing system adapted for processing instructions in a plurality of different program levels having respectively different assigned priorities—wherein said system includes means for defining repetitive microcycles of predetermined duration, means for processing instructions in any selected one of said program levels characterized in that the processing of each instruction spans a plurality of consecutive ones of said microcycles, means for manifesting interruption request conditions in association with each of said program levels characterized in that the request conditions associated with any level have a priority relative to request conditions associated with other levels corresponding to the priority of the associated level relative to the priorities of the other levels, and means conditionally responsive to said manifested request conditions for performing a program level switching operation relative to a selected one of said request conditions, each said switching operation characterized in that it preserves status information relative to the program level in which instructions are currently being processed by said instruction processing means and conditions said instruction processing means for initiating processing of instructions in the program level associated with the selected interruption request condition—the improvement comprising:

means enabling said program level switching means to perform each one of its program level switching operations in a time interval coinciding with a single one of said microcycles during which said instruction processing means may be coincidentially performing a processing operation on any instruction in any of said levels;

means associated with said instruction processing means for generating a master mask signal in association with the processing of any instruction by said processing means, said master mask signal having a duration coinciding with the duration of any selectively predetermined one of the microcycles spanned by the processing of the respective instruction; and means responsive to said master mask signals and said manifested interruption request conditions, for conditioning said program level switching means to be able to perform a said program level switching operation only during the generation of a said master mask signal.

2. In a data processing system in accordance with claim 1 the further improvement wherein said means for conditioning said program level switching means comprises:
- means for storing a plurality of variable mask condition bits in association with said levels, one bit for each of said levels, each said condition bit representing a common mask having either enabling or disabling significance relative to interruption requests of the associated program level;
- means associated with said instruction processing means for selectively varying the condition bits stored by said storing means during a selectively predetermined one of the microcycles spanned by the current processing of an instruction; and
- means responsive to said master mask signals, said common mask condition bits and a selected one of said manifested interruption request conditions associated with a common mask bit having enabling significance, for enabling said program level switching means to perform a said level switching operation relative to said selected request; said selected request being associated with a program level having higher priority than any other program level having both an associated currently manifested interruption request condition and an associated common mask condition bit with enabling significance.

3. In a data processing system in accordance with claim 1 the further improvement wherein said means for manifesting said interruption request conditions includes:
- means for manifesting a plurality of first binary-valued request bit signals variously having on and off condition states, each first request signal being associated with a different one of said program levels and being characterized in that its transition from off condition to on condition is subject to occurring asynchronously in relation to the timing of operations in said instruction processing means;
- means for storing a plurality of second binary-valued request bits variously having on and off condition states, each second request bit being associated with a different one of said program levels; and
- means coupled to said instruction processing means for varying the condition state of a selected ones of said stored second request bits during the current processing of any instruction;
- and wherein said means for conditioning said program level switching means comprises:
- means responsive to a selected one of said first and second request bits having on condition states in conjunction with the generation of a said master mask signal for conditioning said program level switching means to perform a said program level switching operation; said selected one request bit being associated with a program level having higher priority than the program levels associated with any other request bits having on conditions.

4. In a data processing system in accordance with claim 3 the further improvement wherein said means for manifesting said interruption request conditions includes:
- counting means associated with a particular one of said second request signals and a program level associated with said one signal;
- means associated with said instruction processing means, said means for storing said second request signals, and said counting means for setting the second request signal associated with said counting means to its off condition state during the processing of an instruction in the program level associated with said counting means;
- means associated with said instruction processing means for varying the count value condition of said counting means by predetermined incremental amounts during a microcycle in the processing of each instruction in any program level;
- means for testing the count value condition of said counting means in association with each incremental variation thereof; and
- means associated with said testing means for setting the second request signal associated with said counting means to its on condition state when the value tested by said testing means corresponds to a predetermined value; thereby effectively manifesting an interruption request condition relative to the program level associated with said counting means and effectively preparing said means for conditioning said program level switching means to be able to condition said switching means to process instructions in said program level associated with said counting means when no higher priority interruption request condition is being manifested.

5. In a data processing system adapted for processing instructions in a plurality of different program levels having respectively different assigned processing priorities—wherein said system includes means for defining repetitive microcycle intervals of predetermined duration, means for processing instructions in any selected one of said levels characterized in that the processing of each instruction spans a plurality of consecutive ones of said microcycles and consists of an interpretation phase associated with the retrieval and preparation of the instruction followed by an execution phase associated with the execution of functions defined by the instruction, means for manifesting one or more interruption request conditions in association with each of said program levels characterized in that each of said manifested request conditions has a priority corresponding to the priority of the associated program level, and means responsive to said manifested request conditions for performing a program level switching operation relative to a selected one of said request conditions for initiating processing of instructions in the program level associated with the selected request while preserving status relative to a program level currently being processed by said instruction processing means—the improvement comprising:
- means for examining selected ones of said manifested interruption request conditions during a predetermined microcycle spanned by the interpretation phase of the processing of any instruction by said instruction processing means;
- means associated with said request examining means for selecting a highest priority one of said examined requests in any microcycle in which a said examination occurs;
- means responsive to a request selected by said request selecting means for selectively conditioning said program level switching means to perform a program level switching operation relative to the program level associated with the selected request; said switching operation comprising the saving of status information relative to the program currently being processed by said instruction processing means and the preparation of status information for initiating processing of instructions in a program level associated with the selected request; said switching operation being characterized in that it is started and completed in the microcycle in which said request is selected; and means coupling said program level switching means to said instruction processing means for conditioning said instruction processing means to begin processing instructions in the program level associated with said selected request after it has completed the execution processing of the instruction which was being processed when said switching operation was performed.

6. A system in accordance with claim 5 comprising:

means associated with said instruction processing means for manifesting a plurality of different command signals during any one of said microcycles for variously controlling operations of said request examining means and said means for conditioning said program level switching means during said any cycle;

means responsive to certain ones of said command signals for producing a plurality of different control signals in association with different ones of said command signals; and means responsive to a first predetermined one of said control signals for masking selected ones of the request signals currently being manifested by said manifesting means;

said program level switching means comprising:

means responsive to a second predetermined one of said control signals and said manifested requests for performing a status saving portion of a program level switching operation, and means responsive to a third predetermined one of said control signals and said manifested requests for performing a new status preparation portion of a program level switching operation during the same microcycle in which the status saving portion of the same switching operation is performed.

7. A system in accordance with claim 5 comprising:

counting means associated with a predetermined one of said program levels;

means associated with said instruction processing means and said counting means for setting a predetermined count value in said counting means during the execution phase of the processing of an instruction in said predetermined one level;

means associated with said instruction processing means and said counting means for varying the count value in said counting means by predetermined incremental amounts having a microcycle in the interpretation phase processing of any instruction;

means for testing the count value in said counting means in association with each incremental variation thereof;

means associated with said testing means for producing a control signal when said tested count value corresponds to a predetermined value; and means responsive to said control signal for conditioning said request manifesting means to manifest an interruption request condition relative to said predetermined level associated with said counting means.

8. A system in accordance with claim 5 comprising:

means associated with said instruction processing means for generating a master mask signal having a duration corresponding to the duration of a single one of said microcycles in at least one of the microcycles spanned by the processing of each instruction in any of said program levels, said master mask signals being generatable in different relative microcycle time positions in association with the processing of different said instructions; and means responsive to said master mask signals for conditioning said request examining means to examine said interruption requests only during microcycles in which said master mask signal is generated and not during any other microcycles.

9. A system in accordance with claim 6 which includes plural sources of first interruption request condition signals, associated with individual ones of said program levels, characterized in that the respective first condition signals are generated in asynchronous relation to operations of said instruction processing means; and wherein said manifesting means comprises:

means for storing second interruption request conditions in association with individual ones of said program levels;

means associated with said instruction processing means for varying said stored second request conditions in synchronous time relation to microcycles of operation in said instruction processing means; and means for manifesting active ones of said first and second request conditions.

10. A system in accordance with claim 9 in which said request examining means comprises:

means for storing a plurality of binary-valued common mask conditions in association with said program levels, one such condition for each level; each such common mask condition having either enabling or disabling significance relative to the associated program level;

means associated with said instruction processing means for varying the conditions stored in said common mask storing means between enabling and disabling states of significance during the processing of any instruction; and means responsive to the stored common mask conditions for selecting for examination only the manifested first and second interruption request conditions associated with those program levels relative to which the associated common mask conditions having enabling significance.

11. A system in accordance with claim 10 in which said means for varying the conditions stored in said means for storing said second interruption request conditions comprises:

a plurality of AND gates collectively responsive to a predetermined fourth one of said control signals for individually transferring a plurality of data signals accompanying a command associated with said predetermined fourth one of said control signals, said transferred data signals being susceptible of representing interruption request conditions;

a register having stages coupled to individual said AND gates for temporarily storing said transferred data signals; and a second set of AND gates interposed between said stages of said register and said means for storing said second interruption request conditions, said second AND gates being collectively responsive to a predetermined fifth one of said control signals for transferring data signals from said register stages for storage by said means for storing as representations of second interruption request conditions.

12. A system in accordance with claim 10 in which said means for varying the conditions stored in said common mask storing means comprises:
   a plurality of first AND gates collectively responsive to a predetermined fourth one of said control signals for individually transferring a plurality of data signals accompanying the command associated with said predetermined fourth control signal, said transferred data signals being susceptible of representing common mask conditions;
   a register having stages coupled to individual ones of said AND gates for temporarily storing said transferred data signals; and
   a plurality of second AND gates interposed between said register stages and said means for storing said common mask conditions, said second AND gates being collectively responsive to a predetermined fifth one of said control signals for transferring data signals from said register stages for storage as representations of common mask conditions.

13. A system in accordance with claim 8 comprising:
   means associated with said instruction processing means for receiving signals from said instruction processing means during portions of any one of said microcycles; said signals representing a plurality of different commands; and
   means responsive to a predetermined fourth one of said control signals for causing said master mask signal generating means to generate one of said master mask signals.

14. A system in accordance with claim 6 wherein:
   said means for masking selected ones of said mask signals comprises first means responsive to an associated predetermined first one of said control signals for storing common mask conditions represented by signals accompanying the command associated with said first control signal, different ones of said stored common mask conditions being associated with different ones of said program levels;
   said means for examining said manifested interruption requests included second means responsive to an associated predetermined second one of said control signals and to said stored common mask conditions for selecting predetermined ones of said manifested requests;
   said means for selecting said highest priority one of said requests comprises means coupled to said second means for receiving the requests selected by said second means and selecting a highest priority one of said received requests;
   said means for selectively conditioning said program level switching means comprises means for generating "leave" and "start" signals in association with the selection of said highest priority request; and said switching means comprises means for storing current program status relative to any one of said program levels; means for transferring current status information from said current status storing means to said instruction processing means for enabling said instruction processing means to process instructions in said any one level; means for collectively storing program status information in reserve relative to each of said program levels; third means responsive to said leave signals and a predetermined associated third one of said control signals for transferring current status information from said current status storing means to said collective status storing means for reverse storage in association with the program level currently being processed by said instruction processing means; and fourth means responsive to said start signal in association with a predetermined associated fourth one of said control signals occurring during the same microcycle as said third control signal for transferring status information, relative to a program level associated with said highest priority request, from said collective storing means to said current status storing means, thereby preparing said instruction processing means for processing instructions in the program level associated with said highest priority request after said instruction processing means has completed its handling of the instruction which it was processing during the microcycle in which said commands associated with said third and fourth control signals were being transferred.

15. A system in accordance with claim 6 wherein:
   said program level switching means comprises plural reserve registers for storing status words, one for each of said program levels; a current status register for manifesting the current status of a program level currently being processed by said instruction processing means; means activatable in any one of said microcycles for transferring status word information, from said current register to one of said reserve registers associated with the program level currently being processed, in response to a predetermined fourth one of said control signals; means for transferring status information from one of said reserve registers associated with said selected request to said current register in response to a predetermined fifth one of said control signals during said any one microcycle; and means for transferring status information between said current register and said instruction processing means during said any one microcycle, characterized in that status information transferred to said current register during said any one microcycle is made available to said instruction processing means in a microcycle which is delayed by a variable number of microcycles in relation to said one microcycle.

* * * * *